(12) United States Patent
Lee et al.

(10) Patent No.: US 10,631,030 B2
(45) Date of Patent: Apr. 21, 2020

(54) METHOD FOR PROVIDING VIDEO STREAMING SERVICE AND MOBILE DEVICE FOR SAME

(71) Applicants: Samsung Electronics Co., Ltd., Gyeonggi-do (KR); Seoul National University R&DB Foundation, Seoul (KR)

(72) Inventors: Hyung-Ho Lee, Seoul (KR); Taekyoung Kwon, Seoul (KR); Han-Na Lim, Seoul (KR); Dookyoon Han, Seoul (KR); Ji-Cheol Lee, Gyeonggi-do (KR); Youngbin Im, Seoul (KR); Taejoong Chung, Seoul (KR)

(73) Assignees: Samsung Electronics Co., Ltd., Suwon-si (KR); Seoul National University R&DB Foundation, Seoul (KR)

(*) Notice: Subject to any disclaimer, the term of this patent is extended or adjusted under 35 U.S.C. 154(b) by 0 days.

(21) Appl. No.: 14/897,623

(22) PCT Filed: Jun. 10, 2014

(86) PCT No.: PCT/KR2014/005075
§ 371 (c)(1),
(2) Date: Dec. 10, 2015

(87) PCT Pub. No.: WO2014/200242
PCT Pub. Date: Dec. 18, 2014

(65) Prior Publication Data
US 2016/0127754 A1     May 5, 2016

(30) Foreign Application Priority Data
Jun. 10, 2013 (KR) .................. 10-2013-0066062

(51) Int. Cl.
*H04N 21/2343*  (2011.01)
*H04N 21/235*   (2011.01)
(Continued)

(52) U.S. Cl.
CPC ......... *H04N 21/2662* (2013.01); *H04N 19/00* (2013.01); *H04N 21/238* (2013.01);
(Continued)

(58) Field of Classification Search
None
See application file for complete search history.

(56) References Cited

U.S. PATENT DOCUMENTS

2004/0010593 A1* 1/2004 Apostolopoulos ........................... H04L 67/1008
  709/226
2007/0238418 A1* 10/2007 Mizusawa ............. H04W 16/14
  455/69
(Continued)

FOREIGN PATENT DOCUMENTS

KR  10-2009-0037137  4/2009
KR  10-2010-0045669  5/2010
KR  10-2011-0067991  6/2011

OTHER PUBLICATIONS

International Search Report dated Sep. 24, 2014 in connection with International Patent Application No. PCT/KR2014/005075, 4 pages.
(Continued)

*Primary Examiner* — Brian T Pendleton
*Assistant Examiner* — Jean D Saint Cyr

(57) ABSTRACT

A technique for providing a video streaming service is provided. A method of a mobile device for providing a video streaming service includes sending periodically location and moving path information of the mobile device to a first server, receiving bitrate information per location predicted
(Continued)

according to a moving path of the mobile device, from the first server, determining a bitrate for a current location of the mobile device based on the predicated bitrate information per location of the mobile device, and requesting a second server to send video segments based on the bitrate.

11 Claims, 24 Drawing Sheets

(51) Int. Cl.
| | |
|---|---|
| *H04N 21/238* | (2011.01) |
| *H04N 21/24* | (2011.01) |
| *H04N 21/258* | (2011.01) |
| *H04N 21/4402* | (2011.01) |
| *H04N 21/442* | (2011.01) |
| *H04N 21/462* | (2011.01) |
| *H04N 21/6373* | (2011.01) |
| *H04N 21/2662* | (2011.01) |
| *H04N 19/00* | (2014.01) |
| *H04N 21/845* | (2011.01) |
| *H04W 36/32* | (2009.01) |
| *H04N 21/414* | (2011.01) |
| *H04N 21/643* | (2011.01) |
| *H04W 36/00* | (2009.01) |
| *H04W 36/02* | (2009.01) |

(52) U.S. Cl.
CPC . *H04N 21/23805* (2013.01); *H04N 21/25841* (2013.01); *H04N 21/41407* (2013.01); *H04N 21/64322* (2013.01); *H04N 21/8456* (2013.01); *H04W 36/0016* (2013.01); *H04W 36/32* (2013.01); *H04W 36/023* (2013.01)

(56) References Cited

U.S. PATENT DOCUMENTS

| | | | | |
|---|---|---|---|---|
| 2008/0037525 | A1* | 2/2008 | Karaoguz | H04L 29/06027 370/352 |
| 2010/0121977 | A1* | 5/2010 | Kontola | H04L 1/0002 709/232 |
| 2012/0009890 | A1* | 1/2012 | Curcio | H04L 29/06 455/230 |
| 2013/0151693 | A1* | 6/2013 | Baker | H04L 67/18 709/224 |

OTHER PUBLICATIONS

Written Opinion of International Searching Authority dated Sep. 24, 2014 in connection with International Patent Application No. PCT/KR2014/005075, 5 pages.

Thomas Stockhammer, "Dynamic Adaptive Streaming over HTTP—Design Principles and Standards", 2011, 3 pages.

Korean Intellectual Property Office, "Notice of Preliminary Rejection," Application No. KR10-2013-0066062, dated Apr. 11, 2019, 10 pages.

Notice of Final Rejection dated Sep. 2, 2019 in connection with Korean Patent Application No. 10-2013-0066062, 8 pages.

Notice of Patent Grant dated Oct. 30, 2019 in connection with Korean Patent Application No. 10-2013-0066062, 4 pages.

* cited by examiner

| TYPE=BR_RECOMMAND | | |
|---|---|---|
| Position1 (PREDICTED LOCATION) | Time1 | Bitrate1 (kbps) |
| Position2 | Time1 | Bitrate2 (kbps) |
| Position3 | Time1 | Bitrate3 (kbps) |
| ... | ... | ... |

| TYPE=BR_RECOMMAND | | | |
|---|---|---|---|
| Position1 | Time1 (estimated) | Bitrate1 (kbps) | Cache ID (e.g. IP address) |
| Position2 | Time1 | Bitrate2 (kbps) | |
| Position3 | Time1 | Bitrate3 (kbps) | |
| ... | ... | ... | |

FIG.14

METHOD FOR PROVIDING VIDEO STREAMING SERVICE AND MOBILE DEVICE FOR SAME

CROSS-REFERENCE TO RELATED APPLICATION(S)

The present application claims priority under 35 U.S.C. § 365 to International Patent Application No. PCT/KR2014/005075 filed Jun. 10, 2014, entitled "METHOD FOR PROVIDING VIDEO STREAMING SERVICE AND MOBILE DEVICE FOR SAME", and, through International Patent Application No. PCT/KR2014/005075, to Korean Patent Application No. 10-2013-0066062 filed Jun. 10, 2013, each of which are incorporated herein by reference into the present disclosure as if fully set forth herein.

TECHNICAL FIELD OF THE INVENTION

The present disclosure relates generally to a mobile device. More particularly, the present disclosure relates to a method and an apparatus for providing a video streaming service to a mobile device in a mobile network.

BACKGROUND OF THE INVENTION

In recent, mobile devices such as a smart phone and a tablet Personal Computer (PC) rapidly advance, the mobile device allowing wireless voice communication and information exchange becomes necessities in life. In the early supply, the mobile device is considered merely as a portable terminal allowing the wireless communication. As mobile device technologies advance and wireless Internet is adopted, the mobile device allowing simple phone call evolves to a multimedia device for performing schedule management, game, remote control, and image capturing, to thus satisfy user's needs.

In particular, video traffic in a mobile network occupies about 70% of total mobile network traffic, and an amount of the total traffic is also increasing. Further, video traffic in the total network traffic as well as the mobile network is also rising. Based on the current increase of the video traffic, it is expected that video traffic in 2016 will exceed 50% of the total network.

Specifically, as network usage of the mobile device recently increases, a video streaming service for receiving video segments and playing a video in real time is increasingly used. To download video segments, a conventional mobile device selects a bitrate according to current channel state information and thus downloads the video segments. In so doing, when the mobile device is moving fast, when the mobile device enters an environment of poor service quality or an area where Internet is unavailable, or when the mobile device hands over, efficiency of the video streaming service of the mobile device is degraded.

Hence, what is needed is a method for providing a video streaming service of high efficiency according to state information and a location of a mobile device in the mobile device.

SUMMARY OF THE INVENTION

To address the above-discussed deficiencies of the prior art, it is a primary aspect of the present disclosure to provide a method and an apparatus for providing a video streaming service in a mobile device.

Another aspect of the present disclosure is to provide a method and an apparatus for predicting channel state according to location information and selecting a bitrate of a video streaming service corresponding to the predicted channel state in a mobile device.

Yet another aspect of the present disclosure is to provide a method and an apparatus for predicting a bitrate per position for a video streaming service based on a moving path of a mobile device and sending the predicted location-based bitrate information to the mobile device in a location information server.

Still another aspect of the present disclosure is to provide a method and an apparatus for pre-fetching video segments according to predicted channel state in a mobile device.

A further aspect of the present disclosure is to provide a method and an apparatus for, when predicting that a bitrate of a video streaming service abruptly decreases in a moving path, receiving a plurality of low-definition video segments in advance, rather than receiving high-definition video segments, in a mobile device.

A further aspect of the present disclosure is to provide a method and an apparatus for predicting handover of a mobile device and pre-fetching video segments from a storage device of a target base station of the predicted handover, in a location information server.

According to one aspect of the present disclosure, a method of a mobile device for providing a video streaming service includes periodically sending location and moving path information of the mobile device to a first server, receiving bitrate information per location predicted according to a moving path of the mobile device, from the first server, determining a bitrate for a current location of the mobile device based on the predicated bitrate information per location of the mobile device, and requesting a second server to send video segments based on the bitrate.

According to another aspect of the present disclosure, a method of a first server for providing a video streaming service includes periodically receiving location and moving path information from a mobile device, predicting a location to which the mobile device moves after each segment unit time using the location and moving path information of the mobile device, predicting a bitrate per location predicted, and sending predicted bitrate information per location, to the mobile device.

According to yet another aspect of the present disclosure, a method of a Base Station (BS) for providing a video streaming service includes receiving a request to send storage device information for storing video segments for a mobile device, from a first server, sending the storage device information for storing the video segments for the mobile device, to the first server, receiving in advance video segments expected to be requested by the mobile device at a particular prediction location, from the second server, storing the received video segments in the storage device, and after the mobile device hands over to the BS, sending the video segments stored in the storage device, to the mobile device.

According to still another aspect of the present disclosure, an apparatus of a mobile device for providing a video streaming service includes a transceiver for periodically sending location and moving path information of the mobile device to a first server, and receiving bitrate information predicted per location according to a moving path of the mobile device, from the first server, and a controller for controlling to determine a bitrate for a current location of the mobile device based on the predicated bitrate information per location of the mobile device and to request a second server to send video segments based on the bitrate.

According to a further aspect of the present disclosure, an apparatus of a first server for providing a video streaming service includes a transceiver for sending and receiving signals to and from a mobile device, and a controller for controlling to periodically receive location and moving path information from the mobile device, to predict a location to which the mobile device moves after each segment unit time using the location and moving path information of the mobile device, to predict a bitrate per location predicted, and to send predicted bitrate information per location to the mobile device.

According to a further aspect of the present disclosure, an apparatus of a BS for providing a video streaming service includes a transceiver for sending and receiving signals, a storage device for storing video segments to be provided to a mobile device, and a controller for controlling to receive a request to send storage device information for storing video segments for the mobile device, from a first server, to send the storage device information for storing the video segments for the mobile device, to the first server, to receive in advance video segments expected to be requested by the mobile device at a particular prediction location, from the second server, to store the received video segments in the storage device, and after the mobile device hands over to the BS, to send the video segments stored in the storage device, to the mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present disclosure will be more apparent from the following description taken in conjunction with the accompanying drawings, in which:

FIG. 7 illustrates a structure of a message indicating a predicted bitrate per prediction location of a mobile device in a mobile network according to an embodiment of the present disclosure;

FIG. 14 illustrates a structure of a message indicating a bitrate per location of a mobile device and cache information of a target Base Station (BS) in a mobile network according to another embodiment of the present disclosure;

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

Hereinafter, a mobile device includes a mobile communication terminal supporting wireless communication, a smart phone, a tablet Personal Computer (PC), a digital camera, a Moving Picture Experts Group (MPEG)-1 Audio Layer 3 (MP3), a navigation, a laptop, and a netbook.

Figure 1:
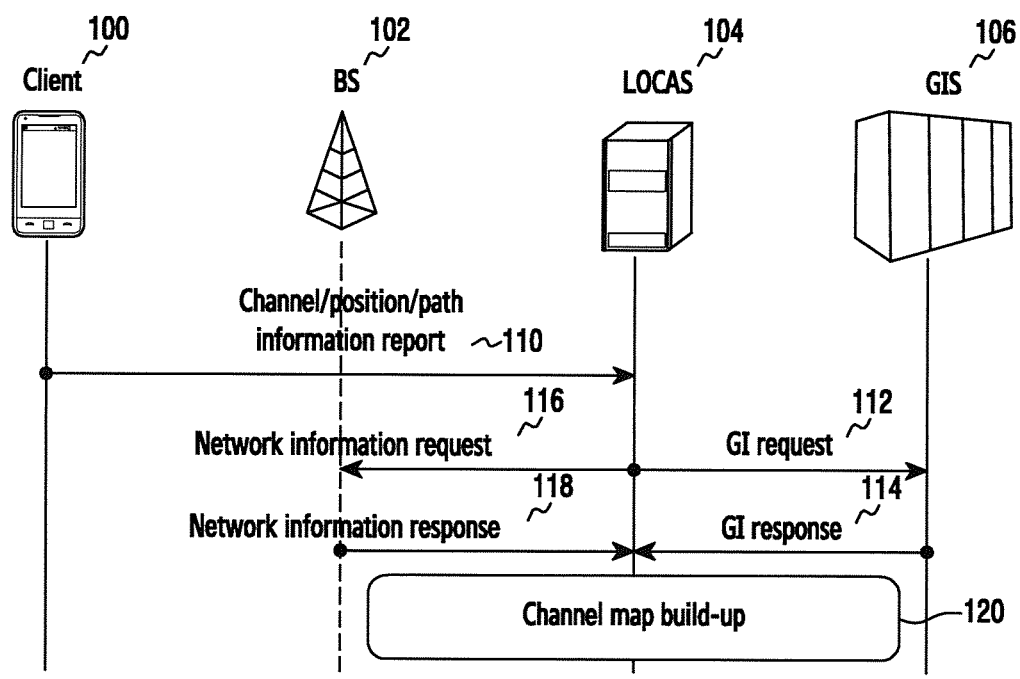
FIG. 1 illustrates a procedure for constructing a channel information database of a mobile device in a mobile network according to an embodiment of the present disclosure.

FIG. 1 illustrates a procedure for constructing a channel information database of a mobile device in a mobile network according to an embodiment of the present disclosure.

Referring to FIG. 1, a mobile network according to an embodiment of the present disclosure includes a mobile device (mobile station or client equipment) 100, a Base Station (BS) 102, a Location Information Server (LOCAS) 104, and a Geographic Information System (GIS) 106.

Figure 2:
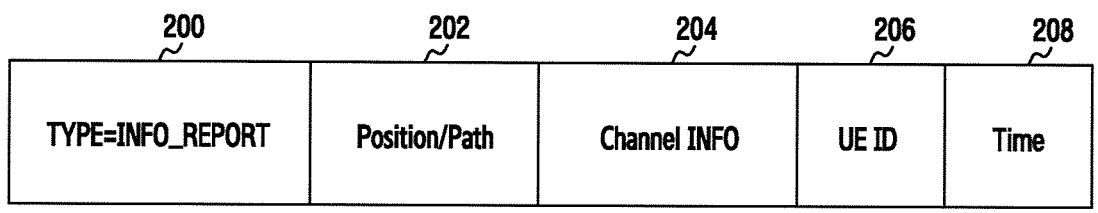
FIG. 2 illustrates a structure of a location information report message of a mobile device in a mobile network according to an embodiment of the present disclosure.

To predict a bitrate for a video streaming service, the mobile device 100 periodically reports necessary information for the LOCAS 104 to predict channel state of a moving path of the mobile device 100 in operation 110. For example, the mobile device 100 can periodically transmit to the LOCAS 104 the report message including, as shown in FIG. 2, type information 200 indicating that the corresponding message is a report message to predict the bitrate of the video streaming service, current location and/or moving path information 202 of the mobile device 100, channel information 204 corresponding to a current location of the mobile device 100, Identification (ID) information 206 of the mobile device 100, and current time information 208. The ID information 206 of the mobile device 100 can be Internet Protocol (IP) of the mobile device, International Mobile Subscriber Identity (IMSI), or Globally Unique Temporary Identifier (GUTI).

In so doing, the mobile device 100 can receive directly from a user, information such as a departure point, a destination, a departure time, transportation, a stopover, and/or a moving path, and send the input moving path information to the LOCAS 104. For example, the mobile device 100 can directly receive "Departure: Seoul, Destination: Busan station, Departure time: 18:30, transportation: KTX No. 1021".

Figure 3A:
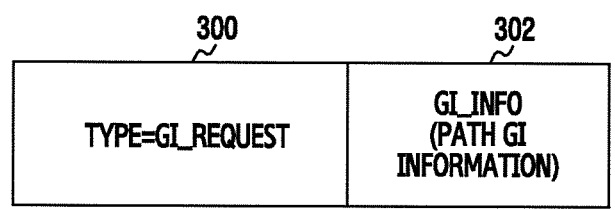
FIG. 3A illustrates a structure of a Geographic Information (GI) request message in a mobile network according to an embodiment of the present disclosure.
Figure 3B:
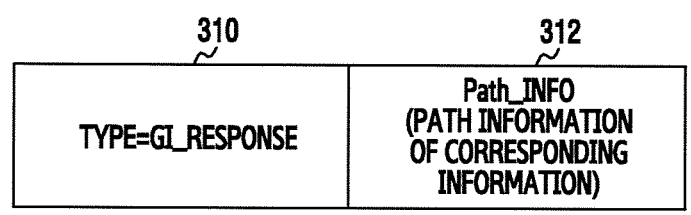
FIG. 3B illustrates a structure of a GI response message in a mobile network according to an embodiment of the present disclosure.

To predict the channel state of the moving path of the mobile device 100, the LOCAS 104 can request additional information corresponding to moving path information of the mobile device 100 from the GIS 106 in operation 112, and obtain the additional information from the GIS 106 in operation 114. For example, the LOCAS 104 can obtain the additional information such as real-time traffic information of the moving path of the mobile device 100, topographical information in the moving path, and transportation information from the GIS 106 using a predefined Application Programming Interface (API) of geographical information contents. In so doing, the LOCAS 104 can transmit a Geographic Information (GI) request message including type information 300 indicating that the corresponding message is the GI request message and moving path information 302 of the mobile device 100 as shown in FIG. 3A, to the GIS 106. Also, the GIS 106, in response to the GI request, can transmit a GI response message including type information 301 indicating that the corresponding message is the GI response message and additional path information 312 of the moving path of the mobile device 100 as shown in FIG. 3B, to the LOCAS 104.

Figure 4A:
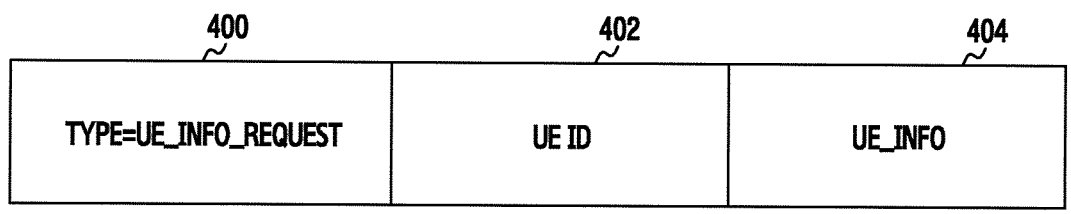
FIG. 4A illustrates a structure of a network information request message in a mobile network according to an embodiment of the present disclosure.
Figure 4B:
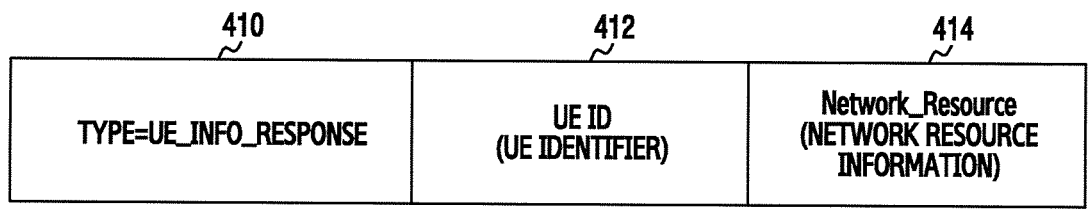
FIG. 4B illustrates a structure of a network information response message in a mobile network according to an embodiment of the present disclosure.

Also, to predict the channel state of the moving path of the mobile device 100, the LOCAS 104 can request network information corresponding to the mobile device 100 from the BS 102 in operation 116, and obtain the network information from the BS 102 in operation 118. For example, the LOCAS 104 can obtain the network information such as resource information to be allocated to the mobile device 100, the number of service users of the BS 102, and congestion of the BS 102, from the BS 102. In so doing, the LOCAS 104 can send to the BS 102 a network information request message, as shown in FIG. 4A, including type information 400 indicating that the corresponding message is the mobile device information request message, ID information 402 of the mobile device 100, and resource allocation information 404 of the mobile device to the BS 102. Herein, the mobile device information 404 can include a Quality of Service (QoS) Class Identifier (QCI) or Allocation and Retention Priority (ARP) of the mobile device. Also, in response to the network information request message, the BS 102 can send a response message, as shown in FIG. 4B, including type information 410 indicating that the corresponding message is the mobile device information response message, ID information 412 of the mobile device 100, and network resource information 414, to the LOCAS 104. In so doing, the network resource information 414 can include a radio resource block allocable by the BS 102 to the mobile device 100 per unit time, the number of service users of the BS 102, and congestion of the BS 102. Herein, the BS 102 can determine the radio resource block allocable to the mobile device 100 based on the QCI or the ARP which is the resource allocation information 404 of the mobile device 100.

Based on the information acquired in operations 110 through 118, the LOCAS 104 can predict the channel state per movement location of the mobile device 100 and construct a database with the prediction result. The LOCAS 104 can periodically update the database.

Hereafter, the present disclosure provides two exemplary embodiments for predicting the bitrate per movement location of user equipment and providing a seamless video streaming service based on the database constructed as stated above.

One exemplary embodiment provides a method for, when the mobile device enters an environment of poor QoS or an area where Internet is not connected, pre-fetching a plurality of video segments to the mobile device based on the predicted channel information.

Another exemplary embodiment provides a method for, when the mobile device is predicted to hand over to a target BS, pre-fetching a plurality of video segments to a storage device of a target BS based on the predicted channel information.

First, one embodiment is elucidated by referring to FIG. 5 through FIG. 10.

Figure 5:
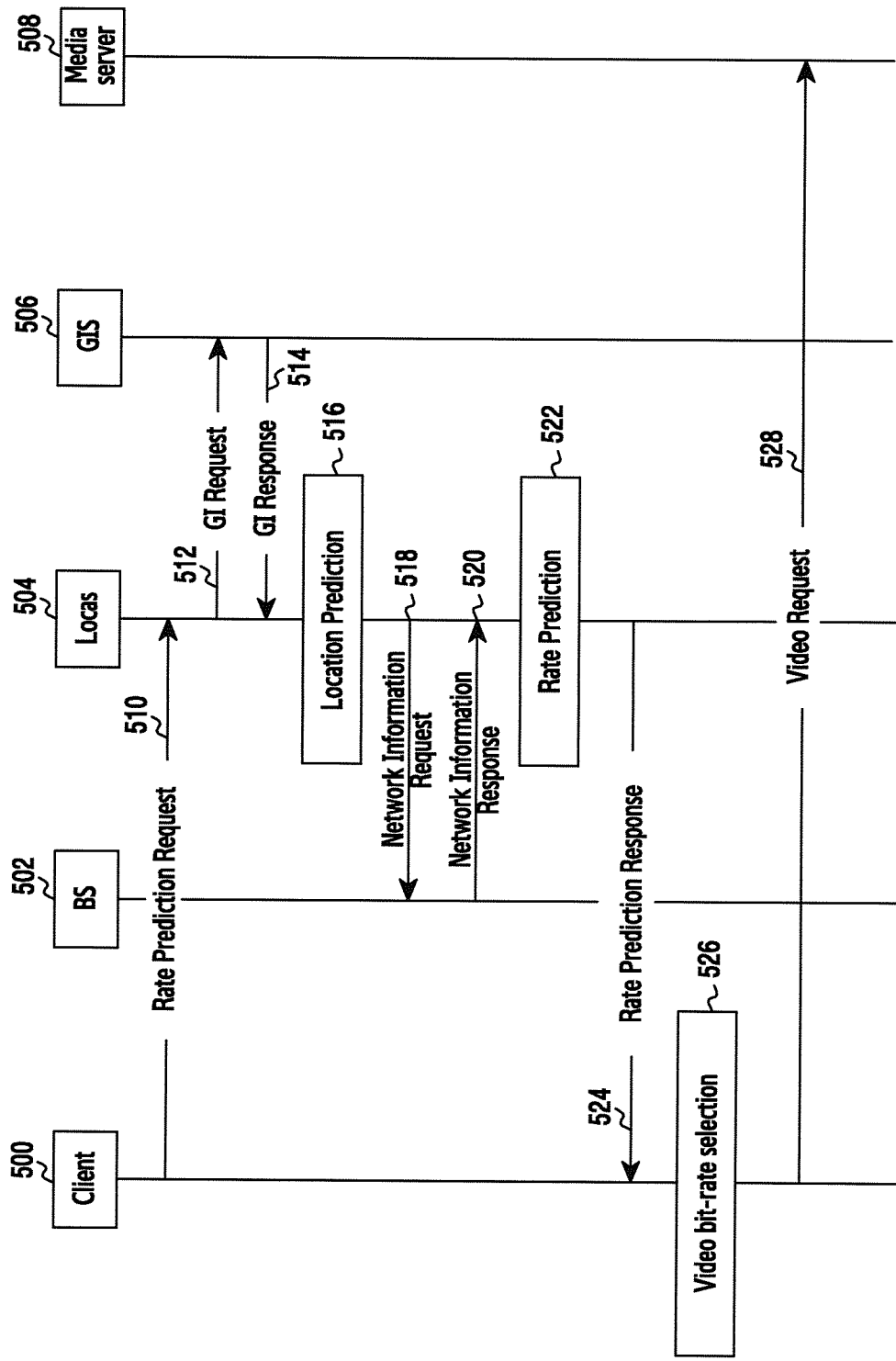
FIG. 5 illustrates signaling for providing a video streaming service according to a moving path of a mobile device in a mobile network according to an embodiment of the present disclosure.

FIG. 5 illustrates signaling for providing a video streaming service according to a moving path of a mobile device in a mobile network according to an embodiment of the present disclosure.

Figure 6:
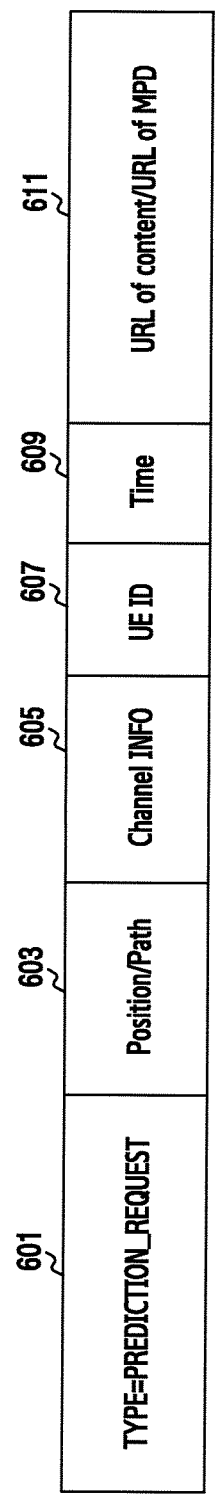
FIG. 6 illustrates a structure of a message of a mobile device for requesting a Location Information Server (LOCAS) to predict a bitrate in a mobile network according to an embodiment of the present disclosure.

Referring to FIG. 5, a mobile device 500 sends a message requesting to predict a bitrate per moving path with respect to video segments of the mobile device 500, to a LOCAS 504 in operation 510. In so doing, the bitrate prediction request message can include, as shown in FIG. 6, type information 601 indicating that the corresponding message is the bitrate prediction request message, current position and/or moving path information 603 of the mobile device 500, channel information 605, ID information 607 of the mobile device 500, current time information 609, and content Uniform Resource Locator (URL) or Media Presentation Description (MPD) URL information 611. The bitrate prediction request message can be transmitted when the mobile device 500 is to receive the video streaming service, when the mobile device 500 is receiving the video streaming service, when a particular event takes place, or on a periodic basis.

The LOCAS 504 receives the bitrate prediction request message from the mobile device 500, sends a GI request message including moving path information of the mobile device 500 to the GIS 506 in operation 512, and thus requests additional path information about the moving path of the mobile device 500. For example, the GI request message can be constructed as shown in FIG. 3A. The GIS 506 receives the GI request message from the LOCAS 504, extracts the moving path information of the mobile device 500 from the received GI request message, retrieves additional information corresponding to the extracted moving path information from the constructed database, and then sends a GI response message including the retrieved additional information to the LOCAS 504 in operation 514. For example, the GI response message can be constructed as shown in FIG. 3B. Herein, the GIS 506 can be a system such as a topographic information system, a traffic information system, a railroad system, or a bus route system. The additional information about the moving path can include topographic information corresponding to the moving path, real-time traffic information corresponding to the moving path, and transportation information of the moving path.

In operation 516, the LOCAS 504 predicts a location to which the mobile device 500 will move after a segment unit time from the current time, based on the information received from the mobile device 500 and the information received from the GIS 506. For example, the LOCAS 504 can calculate a moving speed of the mobile device 500 using the position information of the bitrate request message periodically reported from the mobile device 500, and calculate location coordinates of the mobile device 500 after a particular segment time based on the calculated moving speed.

Equation 1 calculates the location of the mobile device 500.

$$P_{next} = P_{current} + v \cdot t_s \quad (1)$$
$$v = \frac{P_{current} - P_{previous}}{t_{current} - t_{previous}}$$

$P_{next}$ denotes the predicted location to which the mobile device 500 will move after a particular time, $P_{current}$ denotes the current location of the mobile device 500, $P_{previous}$ denotes a previous location of the mobile device 500, and v denotes the moving speed of the mobile device 500. Also, $t_s$ denotes the segment time, $t_{current}$ denotes the time when the current location P current of the mobile device 500 is reported, and $t_{previous}$ denotes the time when the previous location $P_{previous}$ of the mobile device 500 is reported.

That is, as expressed in Equation 1, the LOCAS 504 can assume that the mobile device 500 moves in a straight line from the previous location to the current location, calculate the corresponding moving speed, and then predict the location of the mobile device 500 after the rectilinear motion during a particular segment time.

Also, the LOCAS 504 requests network information from the BS 502 in operation 518. In so doing, the BS 502 indicates a BS predicted to serve the mobile device 500 after a particular segment time, and can be the same as a current serving BS or different from the current serving BS. The BS predicted to serve the mobile device 500 after the particular segment time can be predicted based on predicted location information of the mobile device 500 after the particular segment time. The LOCAS 504 can send the network information request message constructed as shown in FIG. 4A, to the BS 502. After receiving the network information request message from the LOCAS 504, the BS 502 can extract ID information of the mobile device 500 from the network information request message and determine a radio resource to be allocated to the mobile device 500 according to the extracted ID information. In operation 520, the BS 502 sends a network information response message including the radio resource information to be allocated to the mobile device 500, to the LOCAS 504. In so doing, the network information response message can include the network resource information 414 as shown in FIG. 4B. The network resource information 414 can include at least one of the radio resource block to be allocated by the BS 502 to the mobile device 500 per unit time, the number of the service users of the BS 502, and the congestion of the BS 502.

In operation 522, the LOCAS 504 predicts the bitrate per prediction location of the mobile device 500. In so doing, the LOCAS 504 can determine or predict the bitrate corresponding to the predicted location of the mobile device 500 at a particular time along the moving path of the mobile device 500 using the information in the bitrate prediction request message received from the mobile device 500, the GI response message received from the GIS 506, and the network information response message received from the BS 502.

In operation 524, the LOCAS 504 sends a bitrate prediction response message including the bitrate information predicted per prediction location of the mobile device 500, to the mobile device 500. In so doing, the bitrate prediction response message can include, as shown in FIG. 7, type information 701 indicating that the corresponding message is the bitrate prediction response message, predicted location information 703 of the mobile device 500, time information 705 corresponding to the predicted locations, and bitrate information 707 corresponding to the predicted locations. For example, the prediction response message can indicate that the mobile device 500 is predicted to be located at Position 1 at Time 1 after a particular time and that, at Position 1 on Time 1, the mobile device 500 is predicted to receive the video streaming service at Bitrate 1.

The mobile device 500 receives the bitrate prediction response message from the LOCAS 504, and selects a bitrate of the video streaming service based on the bitrate information per prediction location in the bitrate prediction response message in operation 526. Herein, the mobile device 500 can determine where the bitrate abruptly decreases by analyzing the bitrate information per location. When detecting the abrupt bitrate decline, the mobile device 500 can select a lower bitrate than the corresponding bitrate before the abrupt bitrate decline, that is, abrupt channel state degradation. This is to provide the seamless video stream service to the user even when the channel state is abruptly degraded by receiving more video segments with a lower quality, rather than receiving video segments of quality corresponding to the channel state of the corresponding time (e.g., before entering a tunnel), before the abrupt channel state degradation is predicted due to the mobile device 500 entering the tunnel.

Next, the mobile device 500 can send a video request message requesting to send media segments at the selected bitrate, to a media server 508 in operation 528.

Figure 8:
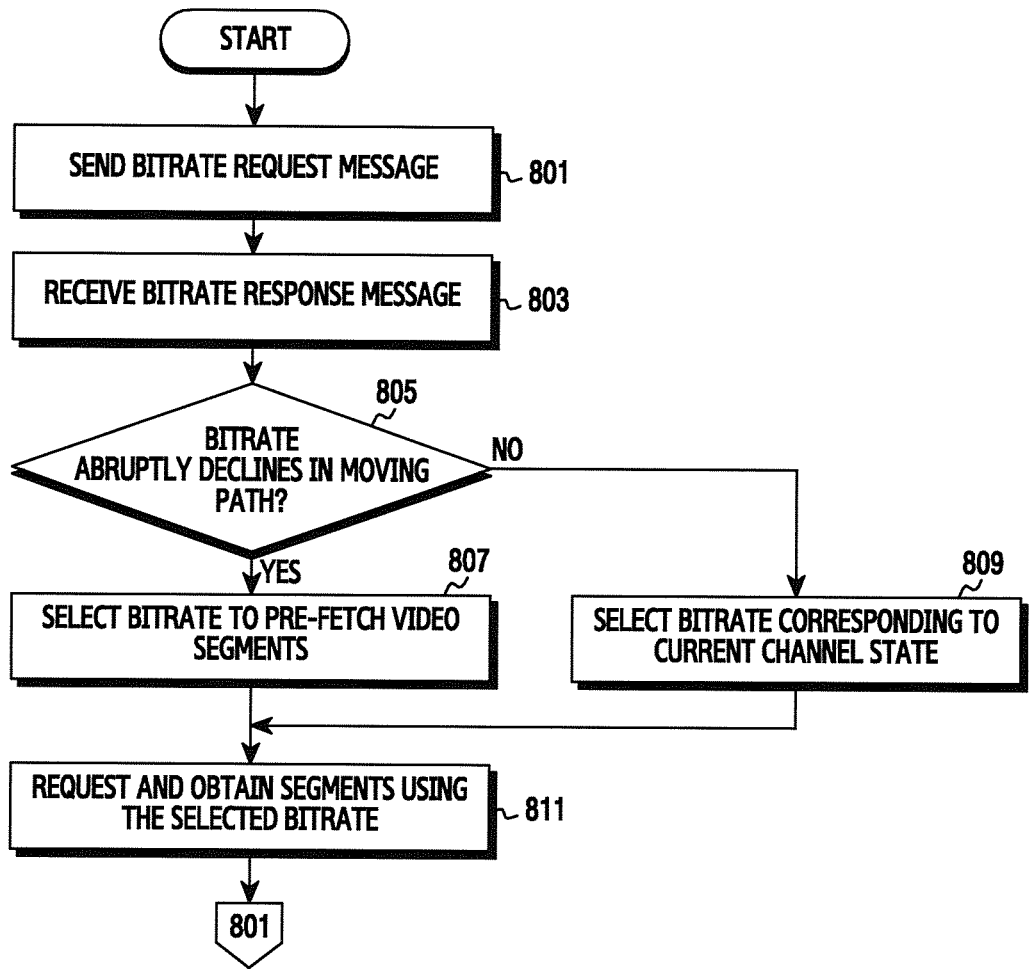
FIG. 8 illustrates a procedure for receiving a video streaming service in a mobile device according to an embodiment of the present disclosure.

FIG. 8 illustrates a procedure for receiving a video streaming service in a mobile device according to an embodiment of the present disclosure.

Referring to FIG. 8, the mobile device 500 sends a message requesting to predict the bitrate per moving path with respect to the video segments of the mobile device 500, to the LOCAS 504 in operation 801. In so doing, the bitrate prediction request message can include, as shown in FIG. 6, the type information 601 indicating that the corresponding message is the bitrate prediction request message, the current position and/or path information 603 of the mobile device 500, the channel information 605, the ID information 607 of the mobile device 500, the current time information 609, and the content URL or MPD URL information 611. The bitrate prediction request message may be transmitted when the mobile device 500 is to receive the video streaming service, when the mobile device 500 is receiving the video streaming service, when a particular event takes place, or on a periodic basis.

Next, the mobile device 500 receives a bitrate response message from the LOCAS 504 in operation 803. In so doing, the bitrate prediction response message can include, as shown in FIG. 7, the type information 701 indicating that the corresponding message is the bitrate prediction response message, the predicted location information 703 of the mobile device 500, the time information 705 corresponding to the predicted locations, and the bitrate information 707 corresponding to the predicted locations. For example, the prediction response message can indicate that the mobile device 500 is predicted to be located at Position 1 at Time 1 after a particular time, and that, at Position 1 on Time 1, the mobile device 500 is predicted to receive the video streaming service at Bitrate 1.

In operation 805, the mobile device 500 analyzes the bitrate response message and thus determines whether the bitrate abruptly decreases in the moving path of the mobile device 500. For example, when bitrate 1 of Position 1 corresponding to Time 1 and bitrate 2 of Position 2 corresponding to Time 2 are greater than or equal to a threshold, or when bitrate 3 of Position 3 corresponding to Time 3 is smaller than the threshold in the bitrate prediction response message as shown in FIG. 7, the mobile device 500 can determine the abrupt bitrate decline in the moving path. For example, when all of bitrate 1, bitrate 2, and bitrate 3 are greater than or equal to the threshold in the bitrate prediction response message as shown in FIG. 7, the mobile device 500 can determine no abrupt bitrate decline in the moving path.

Without the abrupt bitrate decline in the moving path, the mobile device 500 selects the bitrate corresponding to the current channel state based on the bitrate response message in operation 809. In so doing, the mobile device 500 can select the bitrate corresponding to the current time and/or the current location in the bitrate response message. Next, the mobile device 500 sends a message requesting to send video segments based on the selected bitrate, to the media server 508 in operation 811. Next, the mobile device 500 can return to operation 801 and perform the subsequent operation. The mobile device 500 can repeat operation 801 through operation 811 until the video streaming service is ended.

By contrast, with the abrupt bitrate decline in the moving path, the mobile device 500 selects a lower bitrate than the bitrate corresponding to the current channel state in order to pre-fetch video segments in operation 807. Next, the mobile device 500 can send a video request message for requesting to send media segments at the selected bitrate, to the media server 508 in operation 811. For example, when the channel status is expected to abruptly decline as the mobile device 500 enters a tunnel at t2, the bitrate is expected to fall below the threshold, and the mobile device 500 receives the video streaming service by selecting bitrate 2 predicted for time t1, the mobile device 500 is assumed to receive five video segments with a particular quality from the time t1 till the time t2. In so doing, the mobile device 500 can select the bitrate lower than bitrate 2, rather than selecting bitrate 2 at the time t1, and thus receive a plurality (more than five) of video segments of lower quality than the particular quality before the time t2. Hence, the seamless video stream service can be provided to the user even at the time t2.

Figure 9:
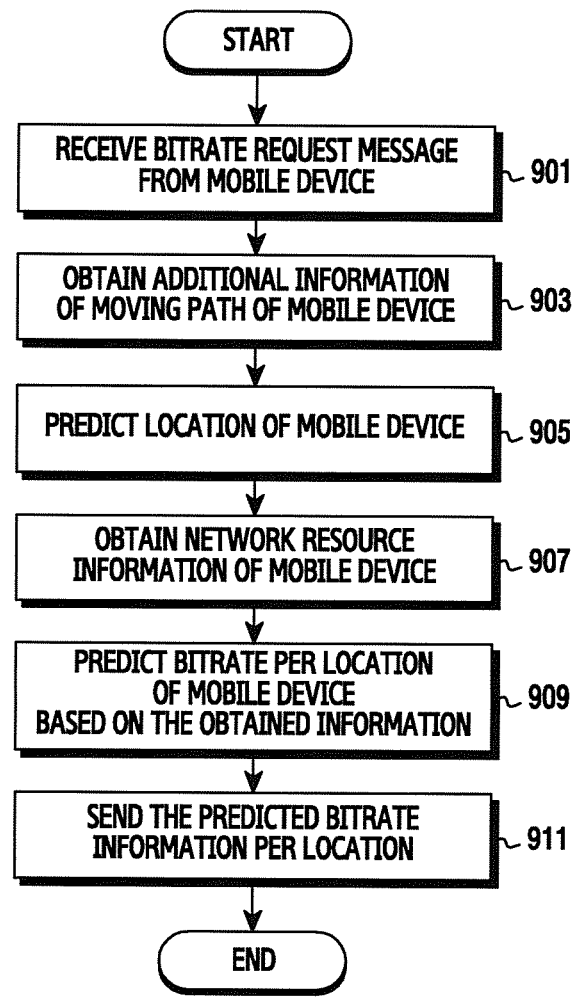
FIG. 9 illustrates a procedure for providing a video streaming service of a mobile device in a LOCAS according to an embodiment of the present disclosure.

FIG. 9 illustrates a procedure for providing a video streaming service of a mobile device in a LOCAS according to an embodiment of the present disclosure;

Referring to FIG. 9, the LOCAS 504 receives a message requesting to predict the bitrate per moving path with respect to the video segments, from the mobile device 501 in operation 901. In so doing, the bitrate prediction request message can include the type information 601 indicating that the corresponding message is the bitrate prediction request message, the current position and/or moving path information 603 of the mobile device 500, the channel information 605, the ID information 607 of the mobile device 500, the current time information 609, and the content URL or MPD URL information 611 as shown in FIG. 6.

In operation 903, the LOCAS 504 sends a GI request message including the moving path information of the mobile device 500, to the GIS 506 and thus obtains additional path information about the moving path of the mobile device 500. For example, the LOCAS 504 can send the GI request message of FIG. 3A to the GIS 506, and receive the GI response message of FIG. 3B from GIS 506 in response. Herein, the GI request message can include, as the additional information of the moving path, the topographic information corresponding to the moving path, the real-time traffic information corresponding to the moving path, and the transportation information of the moving path.

In operation 905, the LOCAS 504 predicts a location to which the mobile device 502 will move after the segment unit time from the current time, based on the information received from the mobile device 500 and the information received from the GIS 506. For example, the LOCAS 504 predicts the location of the mobile device 500 corresponding to the times t1, t2, t3, . . . , and to based on Equation 1.

In operation 907, the LOCAS 504 obtains network resource information of the user equipment through the BS 502 predicted to serve the mobile device 500 after a particular segment time. Herein, the BS predicted to serve the mobile device 500 after the particular segment time can be predicted based on the predicted location information of the mobile device 500 after the particular segment time. The LOCAS 504 can send the network information request message of FIG. 4A to the BS 502, receive the network information response message of FIG. 4B from the BS 502 in response, and thus obtain the network resource information of the user equipment. The network resource information of the user equipment can include at least one of the radio resource block to be allocated by the BS 502 to the mobile device 500 per unit time, the number of the service users of the BS 502, and the congestion of the BS 502.

In operation 909, the LOCAS 504 predicts the bitrate per prediction location of the mobile device 500 based on the obtained information. In so doing, the LOCAS 504 can determine or predict the bitrate corresponding to the predicted location of the mobile device 500 at a particular time along the moving path of the mobile device 500 using the information contained in the bitrate prediction request message received from the mobile device 500, the GI response message received from the GIS 506, and the network information response message received from the BS 502.

Next, the LOCAS 504 sends the bitrate prediction response message including the predicted bitrate information per prediction location of the mobile device 500, to the mobile device 500 in operation 911. In so doing, the bitrate prediction response message can include the type information 701 indicating that the corresponding message is the bitrate prediction response message, the predicted location information 703 of the mobile device 500, the time information 705 corresponding to the predicted locations, and the bitrate information 707 corresponding to the predicted locations as shown in FIG. 7. For example, the prediction response message can indicate that the mobile device 500 is predicted to be located at Position 1 at Time 1 after a particular time, and that, at Position 1 on Time 1, the mobile device 500 is predicted to receive the video streaming service at Bitrate 1. Next, the LOCAS 504 finishes this procedure according to an embodiment of the present disclosure.

In the above-mentioned embodiment of the present disclosure, while the LOCAS 504, the GIS 506, and the media server 508 are independently separated by way of example, at least two servers of the LOCAS 504, the GIS 506, and the media server 508 may be configured as a single server.

Figure 10:
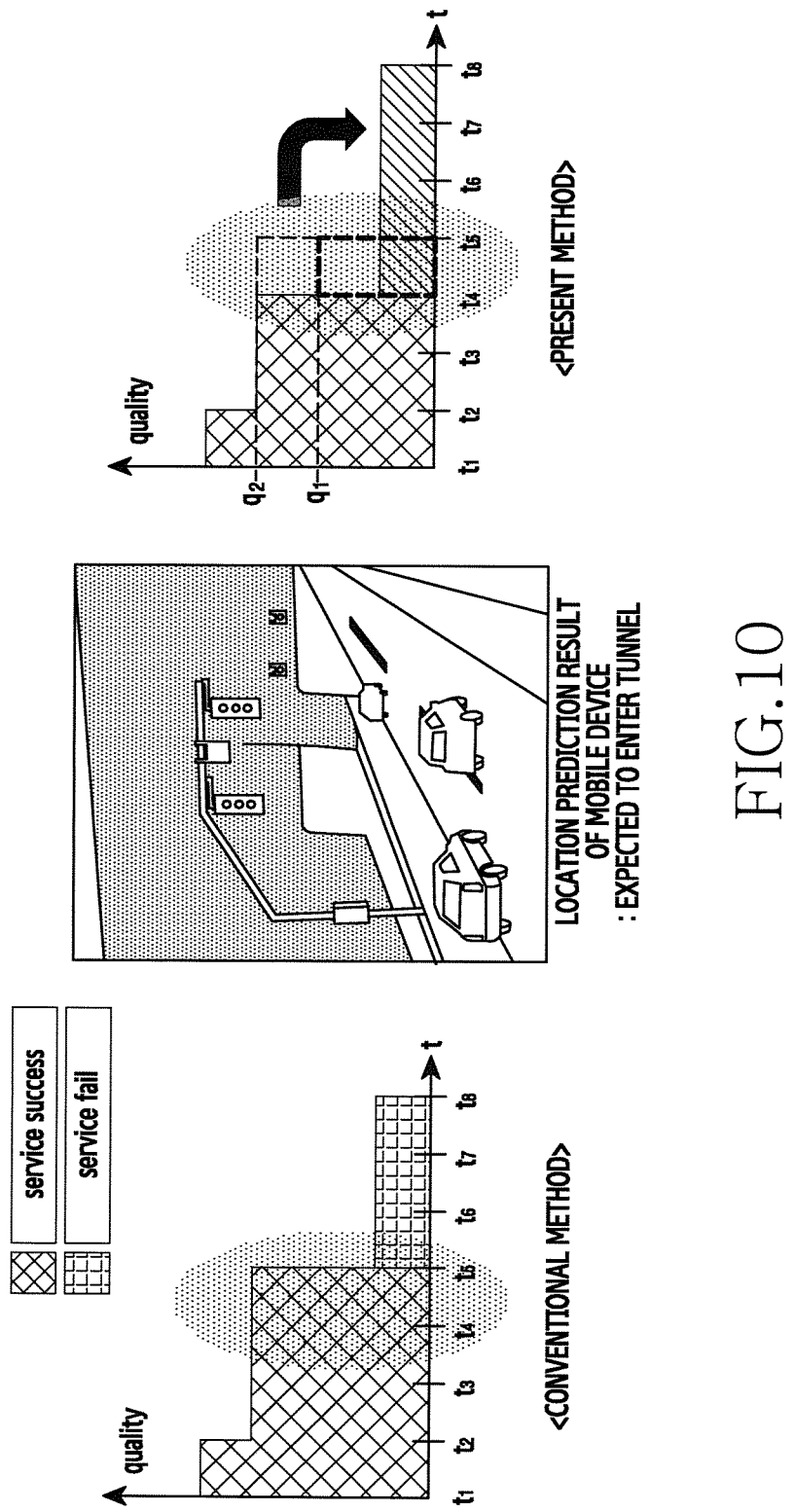
FIG. 10 illustrates a graph of conventional and present bitrate selections according to a location of a mobile device.

FIG. 10 depicts a graph of conventional and present bitrate selections according to a location of a mobile device.

Referring to FIG. 10, it is assumed that the mobile device 500 enters a tunnel at a time t5, stays in the tunnel from the time t5 and a time t8, and accordingly the channel state is severely degraded. In this situation, in a conventional video streaming service, the mobile device 500 selects the bitrate based on the current time and thus cannot receive the video streaming service due to the poor channel state from the time t8 to the time t8.

By contrast, in the video streaming service according to an embodiment of the present disclosure, the mobile device 500 can recognize that a low bitrate is predicted before the time t5 (between a time t1 and a time t4) based on the poor channel state from the time t5 to the time t8. Accordingly, the mobile device 500 according to an embodiment of the present disclosure can select a much lower bitrate for receiving N more video segments with the lower quality q1 than the quality q2, rather than selecting the bitrate for receiving N video segments with the quality q2 according to the corresponding channel state at the time t4, and thus receive in advance the multiple video segments before the time t5. Thus, the seamless video streaming service can be provided from the time t4 to the time t8. Herein, when at least one N-ary video segments are required to provide the seamless video streaming service from the time t4 to the time t5 and at least one M-ary video segments are required to provide the seamless video streaming service from the time t5 to the time t8, the mobile device 500 can select the bitrate for receiving (N+M)-ary video segments from the time t4 to the time t5.

Next, another embodiment is elucidated by referring to FIG. 11 through FIG. 17.

Figure 11:
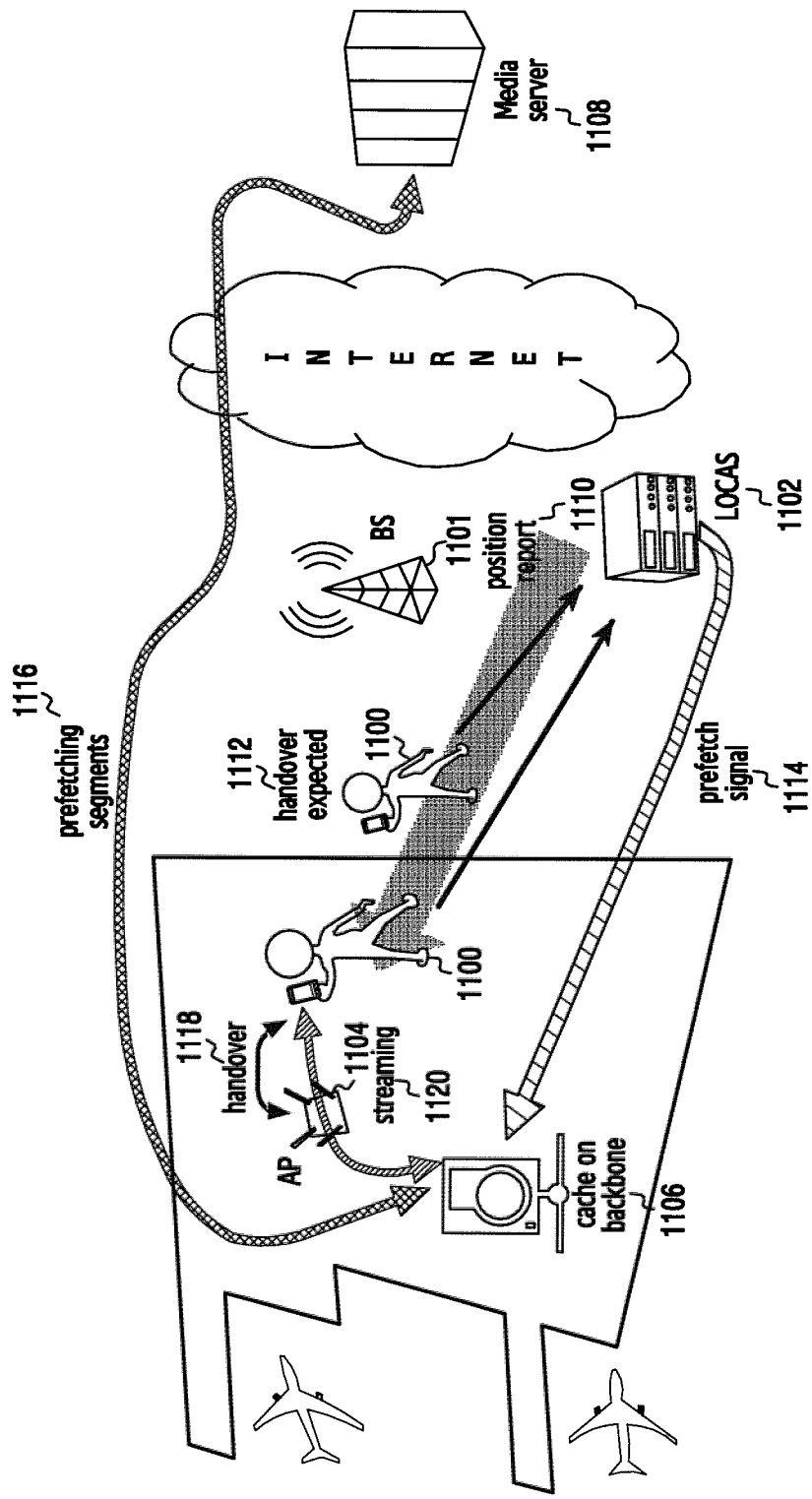
FIG. 11 illustrates a structure of a mobile network according to another embodiment of the present disclosure.

FIG. 11 illustrates a structure of a mobile network according to another embodiment of the present disclosure.

Referring to FIG. 11, to predict a bitrate of a video streaming service during the video streaming service, a mobile device 1100 periodically reports necessary information for a LOCAS 1102 to predict channel state of a moving path of the mobile device 1100 in operation 1110. In so doing, the message periodically reported can be constructed as shown in FIG. 2. The LOCAS 1102 predicts handover of the mobile device using the message periodically reported from the mobile device 1100 in operation 1122. That is, the LOCAS 1102 can predict a location to which the mobile device 1100 will move after a segment unit time from a current time, and predict whether the mobile device 1100 hands over based on the predicted location. For example, when a location of the mobile device 1100 predicted at the time t2 falls within coverage of a particular Access Point (AP) 1104, the LOCAS 1102 can expect that the mobile device 1100 will hand over from a serving BS 1101 currently connected, to the AP 1104 at the time t2. When expecting the handover of the mobile device 1100, the LOCAS 1102 sends a signal requesting to pre-fetch video segments expected to be requested by the mobile device 1100 at the time t2, to the AP 1104 which is a handover target BS in operation 1114.

The AP 1104 receiving a pre-fetch signal from the LOCAS 1102 requests a media server 1108 to send video segments expected to be requested by the mobile device 1100 at the time t2, and thus receives from the media server 1108 and stores the video segments in operation 1106. In so doing, the AP 1104 can store the video segments in a Contents Delivery Network (CDN) or a cache 1106 coupled to the AP 1104. That is, before the time t2, the AP 1104 can receive from the media server 1108 and store the video segments expected to be required by the mobile device 1102 at the time t2.

Next, the mobile device 1100 can hand over to the AP 1104 in operation 1118, and receive the seamless video streaming service by receiving the video segments from the AP 1104.

Figure 12:
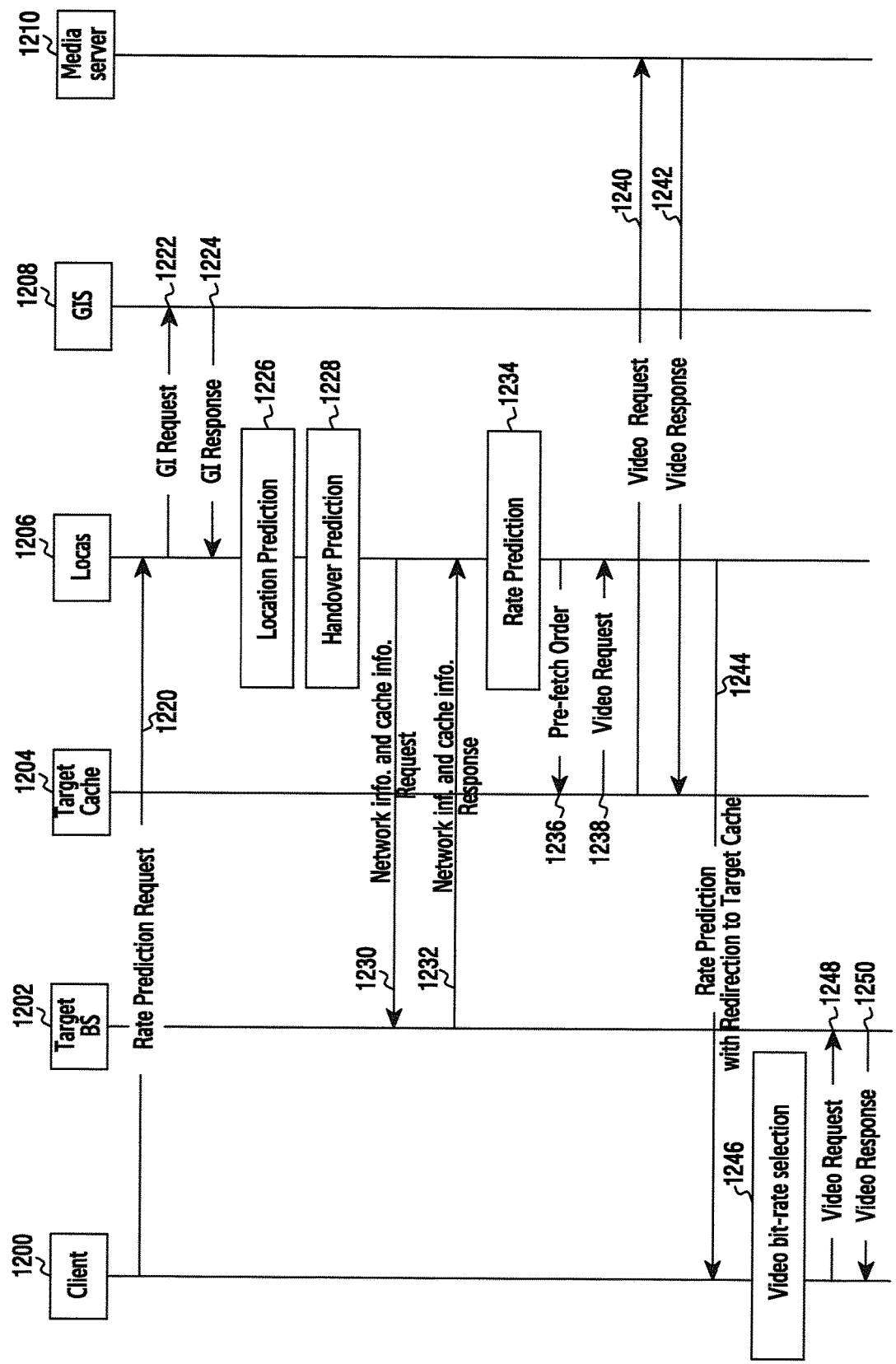
FIG. 12 illustrates signaling for providing a video streaming service according to handover of a mobile device in a mobile network according to another embodiment of the present disclosure.

FIG. 12 illustrates signaling for providing a video streaming service according to handover of a mobile device in a mobile network according to another embodiment of the present disclosure.

Referring to FIG. 12, to predict a bitrate of a video streaming service during the video streaming service, a mobile device 1200 sends a message for reporting necessary information to predict channel state of a moving path of the mobile device 1200, to a LOCAS 1206 in operation 1220. In so doing, the report message is constructed as shown in FIG. 2 and can be transmitted on a periodic basis.

The LOCAS 1206 receives a bitrate prediction request message from the mobile device 1200, sends a GI request message including moving path information of the mobile device 1200 to a GIS 1208 in operation 1222, and thus requests additional path information about the moving path of the mobile device 1200. For example, the GI request message can be constructed as shown in FIG. 3A. The GIS 1208 receives the GI request message from the LOCAS 1206, extracts the moving path information of the mobile device 1200 from the received GI request message, retrieves additional information corresponding to the extracted moving path information from the constructed database, and then sends a GI response message including the retrieved additional information to the LOCAS 1206 in operation 1224. For example, the GI response message can be constructed as shown in FIG. 3B. Herein, the GIS 1208 can be a system such as a topographic information system, a traffic information system, a railroad system, or a bus route system. At this time, the additional information of the moving path can include topographic information corresponding to the moving path, real-time traffic information corresponding to the moving path, and transportation information of the moving path.

In operation 1226, the LOCAS 1206 predicts a location to which the mobile device 1200 will move after a segment unit time from the current time, based on the information received from the mobile device 1200 and the information received from the GIS 1208. For example, the LOCAS 1206 can calculate a moving speed of the mobile device 1200 using the position information of the bitrate request message periodically reported from the mobile device 1200, and calculate location coordinates of the mobile device 1200 after a particular segment time based on the calculated moving speed as expressed in Equation 1.

Next, the LOCAS 1206 predicts handover of the mobile device using the message periodically reported from the mobile device 1200 in operation 1228. That is, the LOCAS 1206 can predict the location to which the mobile device 1200 will move after the segment unit time from the current time, and predict whether the mobile device 1200 hands over based on the predicted location. For example, when a location of the mobile device 1200 predicted at a particular time falls within coverage of a target BS 1202, the LOCAS 1206 can expect that the mobile device 1200 hands over from a serving BS (not shown) currently connected, to the target BS 1202 at a particular time.

Figure 13A:
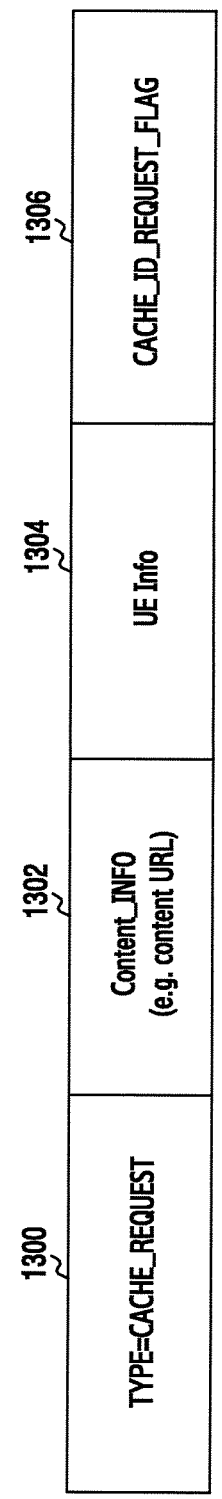
FIG. 13A illustrates a structure of a network information and cache information request message in a mobile network according to another embodiment of the present disclosure.

When expecting that the mobile device 1200 hands over to the target BS 1202, the LOCAS 1206 sends a network information and cache information request message to the target BS 1202 in operation 1230. The network information and cache information request message can include, as shown in FIG. 13A, type information 1300 indicating that the corresponding message is the information request message about the mobile device 1200, ID information 1302 of the mobile device 1200, resource information 1304 of the mobile device 1200, and a cache ID request flag 1306. Herein, the resource information 1304 of the mobile device 1200 can be QCI or ARP of the mobile device. The cache ID request flag, which is a 1-bit flag, can request a cache ID of the target BS 1202. That is, the LOCAS 1206 can send the network information and cache information request message of FIG. 13A to the target BS 1202, and thus request network resource information allocable by the target BS 1202 to a user equipment, and a cache (or target cache) address of the target BS 1202.

Figure 13B:
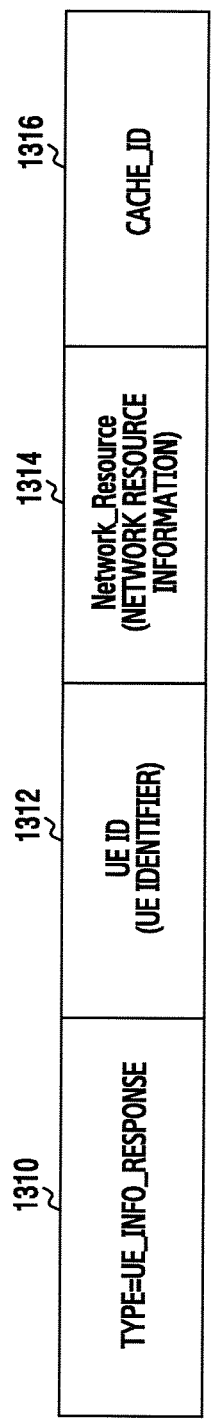
FIG. 13B illustrates a structure of a network information and cache information response message in a mobile network according to another embodiment of the present disclosure.

After receiving the network information and cache information request message from the LOCAS 1206, the target BS 1202 can extract the ID information and the resource allocation information of the mobile device 1202 from the network information request message, and then determine a radio resource to be allocated to the mobile device 1200 based on the extracted information. Also, the target BS 1202 obtains the ID (or IP address) of a target cache 1204 coupled to the target BS 1202. The target BS 1202 sends a network information and cache information response message including the radio resource information to be allocated to the mobile device 1200 and the cache ID, to the LOCAS 1206 in operation 1232. In so doing, the network information and cache information response message can include, as shown in FIG. 13B, type information 1310 indicating that the corresponding message is a response message of the mobile device 1200, ID information 1312 of the mobile device 1200, network resource information 1314, and cache ID information 1316. In so doing, the network resource information 1314 can include at least one of a radio resource block allocable by the target BS 1202 to the mobile device 1200 per unit time, the number of service users of the target BS 1202, and congestion of the target BS 1202.

In operation 1234, the LOCAS 1206 predicts the bitrate per prediction location of the mobile device 1200. In so doing, the LOCAS 1206 can determine or predict the bitrate corresponding to the predicted location of the mobile device 1200 at a particular time along the moving path of the mobile device 1200 using the information contained in the bitrate prediction request message received from the mobile device 1200, the GI response message received from the GIS 1208, and the network information and cache information response message received from the target BS 1202.

Figure 13C:
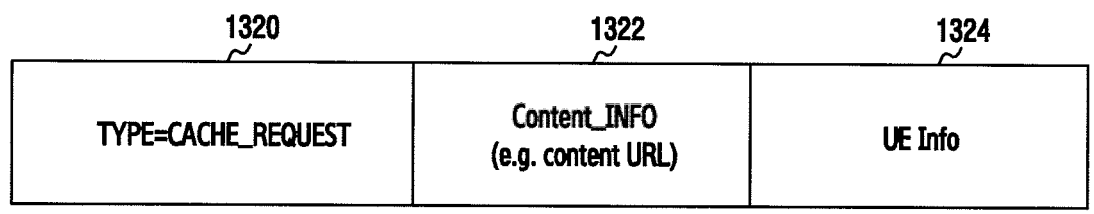
FIG. 13C illustrates a structure of a pre-fetching request message in a mobile network according to another embodiment of the present disclosure.

Next, using the cache ID information obtained from the target BS 1202, the LOCAS 1206 sends a message requesting to pre-fetch video segments expected to be requested by the mobile device 1200 after the handover, to the target cache 1204 coupled to the target BS 1202 in operation 1236. Herein, the pre-fetch request message can include, as shown in FIG. 13C, type information 1320 indicating that the corresponding message is a request message to the cache 1204, content information (e.g., content URL) 1322 used by the mobile device 1200 through the video streaming service, and information 1324 of the mobile device 1200.

The target cache 1204 receiving the pre-fetching request message from the LOCAS 1206 sends a response message notifying the pre-fetching to the LOCAS 1208 in operation 1238. Next, the target cache 1204 sends a video request message requesting to send video segments expected to be requested by the mobile device 1200 after the handover, to a media server 1210 in operation 1240. In so doing, the video request message can include the ID information and the corresponding content information of the corresponding mobile device 1200. In operation 1242, the media server 1210 sends a video response message including the video segments expected to be requested by the mobile device 1200 after the handover, to the target cache 1204. The target cache 1204 stores the video segments received from the media server 1210 before the mobile device 1200 hands over to the target BS 1202.

In operation 1244, the LOCAS 1206 sends a bitrate prediction response message including the predicated bitrate information per prediction location of the mobile device 1200 and the target cache information per prediction location, to the mobile device 1200. In so doing, the bitrate prediction response message can include, as shown in FIG. 14, type information 1400 indicating that the corresponding message is the bitrate prediction response message, predicted position information 1401 of the mobile device 1200, time information 1402 corresponding to the prediction location, bitrate information 1403 corresponding to the predicted position, and cache ID information 1404 corresponding to the predicted position. For example, the prediction response message can indicate that the mobile device 1200 is predicted to be located at Position 1 at Time 1 after a particular time and that, at Position 1 at Time 1, the mobile device 1200 is predicted to receive the video streaming service from the target cache having the corresponding cache ID at Bitrate 1.

The mobile device 1200 receives the bitrate prediction response message from the LOCAS 1206, and hands over from the serving BS (not shown) to the target BS 1202 according to the location movement. Next, the mobile device 1200 selects the bitrate of the video streaming service based on the bitrate information per prediction location contained in the bitrate prediction response message in operation 1246. The mobile device 1200 determines presence of the cache ID information corresponding to the current location and the selected bitrate, and sends a video request message requesting to send video segments at the selected bitrate, to the target cache 1204 having the corresponding cache ID in operation 1248. Next, the target cache 1204 can send a video response message including video segments pre-stored, to the mobile device 1200.

Figure 15:
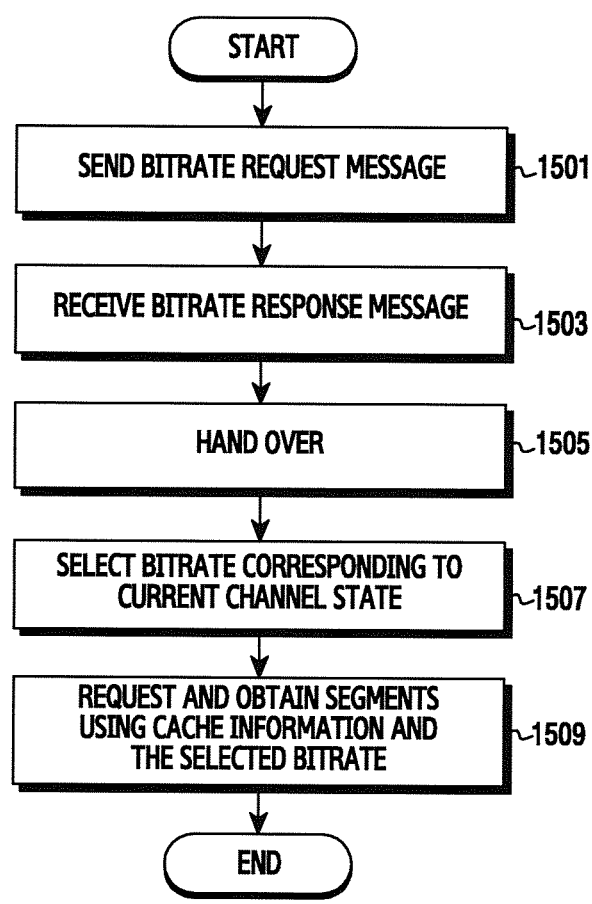
FIG. 15 illustrates a procedure for receiving a video streaming service in a mobile device according to another embodiment of the present disclosure.

FIG. 15 illustrates a procedure for receiving a video streaming service in a mobile device according to another embodiment of the present disclosure.

Referring to FIG. 15, to predict a bitrate of a video streaming service during the video streaming service, the mobile device 1200 sends a message reporting necessary information to predict channel state of a moving path of the mobile device 1200, to the LOCAS 1206 in operation 1501. In so doing, the report message can be constructed as shown in FIG. 6. At this time, the report message may be transmitted when the mobile device 500 is to receive the video streaming service, when the mobile device 500 is receiving the video streaming service, when a particular event takes place, or on a periodic basis.

Next, the mobile device 1200 receives a bitrate response message from the LOCAS 1206 in operation 1503. In so doing, the bitrate prediction response message can include, as shown in FIG. 14, the type information 1400 indicating that the corresponding message is the bitrate prediction response message, the predicted location information 1403 of the mobile device 1200, the time information 1402 corresponding to the predicted locations, the bitrate information 1403 corresponding to the predicted locations, and cache ID information 1404 corresponding to the predicted position. For example, the prediction response message can indicate that the mobile device 1200 is predicted to be located at Position 1 at Time 1 after a particular time and that the mobile device 500 at Position 1 at Time 1 is predicted to receive the video streaming service from the target cache having the corresponding cache ID at Bitrate 1.

The mobile device 1200 hands over to the target BS 1202 according to the location movement in operation 1505, and selects a bitrate corresponding to the current location based on the bitrate response message in operation 1507. In so doing, the bitrate response message can include the cache ID information of the target BS 1202 corresponding to the current location.

In operation 1509, the mobile device 1200 can request the target cache 1204 to send video segments using the cache ID corresponding to the current location and the selected bitrate, and receive the video segments from the target cache 1204. Next, the mobile device 1200 finishes the algorithm according to another embodiment of the present disclosure.

Figure 16:
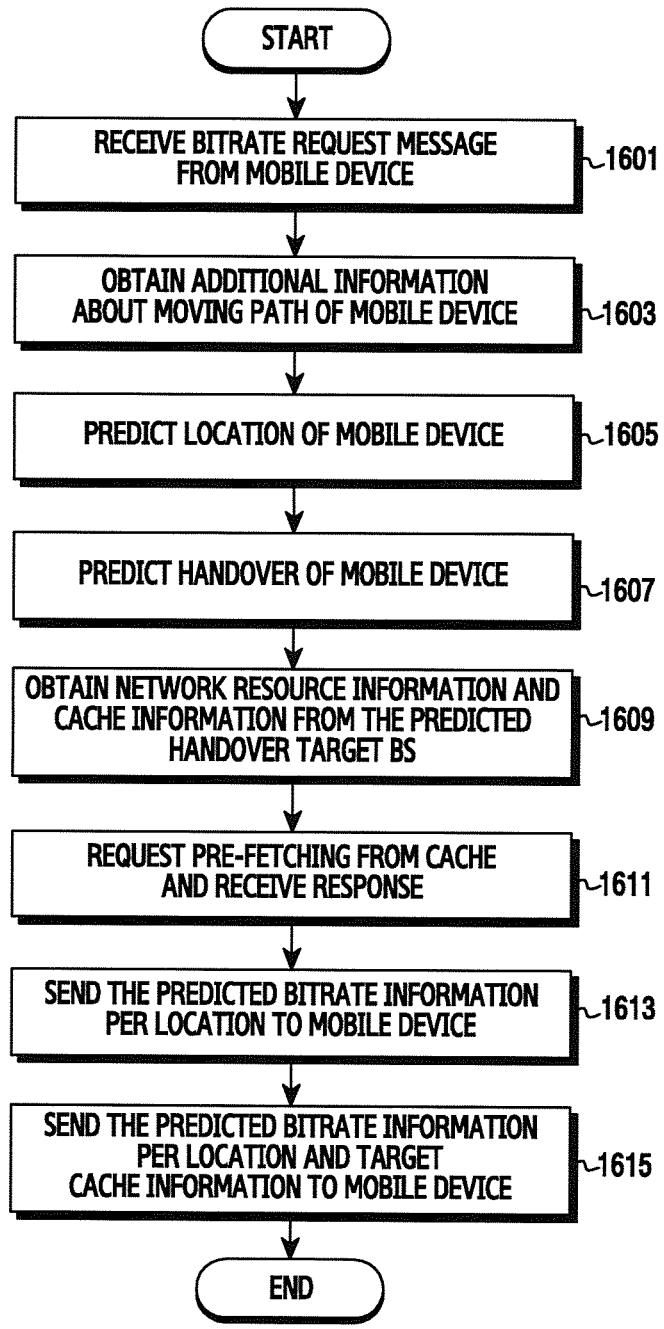
FIG. 16 illustrates a procedure for providing a video streaming service to a mobile device in a LOCAS according to another embodiment of the present disclosure.

FIG. 16 illustrates a procedure for providing a video streaming service to a mobile device in a LOCAS according to another embodiment of the present disclosure.

Referring to FIG. 16, the LOCAS 1206 receives a message requesting to predict the bitrate per moving path with respect to video segments, from the mobile device 1200 in operation 1601. In so doing, the bitrate prediction request message can be constructed as shown in FIG. 6.

In operation 1603, the LOCAS 1206 sends a GI request message including the moving path information of the mobile device 1200, to the GIS 1208 and thus obtains additional path information of the moving path of the mobile device 1200. For example, the LOCAS 1206 can send the GI request message of FIG. 3A to the GIS 1208 and receive the GI response message of FIG. 3B from GIS 1208 in response. Herein, the GI request message can include, as the additional information of the moving path, the topographic information corresponding to the moving path, the real-time traffic information corresponding to the moving path, and the transportation information of the moving path.

In operation 1605, the LOCAS 1206 predicts a location to which the mobile device 1200 will move after the segment unit time from the current time, based on the information received from the mobile device 1200 and the information received from the GIS 1208. For example, the LOCAS 1206 predicts the location of the mobile device 1200 corresponding to the times t1, t2, t3, . . . , and to based on Equation 1.

In operation 1607, the LOCAS 1206 predicts handover of the mobile device 1200 using the message periodically reported from the mobile device 1200. That is, the LOCAS 1206 can predict the location to which the mobile device 1200 will move after the segment unit time from the current time, and predict whether the mobile device 1200 hands over based on the predicted location. For example, when the location of the mobile device 1200 predicted at a particular time falls within the coverage of the target BS 1202, the LOCAS 1206 can expect that the mobile device 1200 hands over from the serving BS (not shown) currently connected, to the target BS 1202 at a particular time.

Next, the LOCAS 1206 obtains the network resource information of the user equipment and the ID (or IP address) of the cache coupled to the target BS through the target BS 1202 to which the mobile device 1200 will hand over in operation 1609. The LOCAS 1206 can send the network information and cache information request message of FIG. 13A to the target BS 1202, receive the network information and cache information response message of FIG. 13B from the target BS 1202 in response, and thus obtain the network resource information of the user equipment and the target cache information. Herein, the network resource information of the user equipment can include at least one of the radio resource block to be allocated by the target BS 1202 to the mobile device 1200 per unit time, the number of the service users of the target BS 1202, and the congestion of the target BS 1202.

Next, the LOCAS 1206 predicts the bitrate per prediction location of the mobile device 1200 based on the obtained information in operation 1611. In so doing, the LOCAS 1206 can determine or predict the bitrate corresponding to the predicted location of the mobile device 1200 at a particular time along the moving path of the mobile device 1200 using the information contained in the bitrate prediction request message received from the mobile device 1200, the GI response message received from the GIS 1208, and the network information and cache information response message received from the target BS 1202.

Next, using the cache ID information obtained from the target BS 1202, the LOCAS 1206 sends a message requesting to pre-fetch video segments expected to be requested by the mobile device 1200 after the handover, to the target cache 1204 coupled to the target BS 1202 in operation 1613. Herein, the pre-fetch request message can include, as shown in FIG. 13C, the type information 1320 indicating that the corresponding message is a request message to the cache 1204, the content information (e.g., content URL) 1322 used by the mobile device 1200 through the video streaming service, and the information 1324 of the mobile device 1200.

In operation 1615, the LOCAS 1206 sends a bitrate prediction response message including the predicated bitrate information per prediction location of the mobile device 1200 and the target cache information per prediction location, to the mobile device 1200. In so doing, the bitrate prediction response message can include, as shown in FIG. 14, the type information 1400 indicating that the corresponding message is the bitrate prediction response message, the predicted position information 1401 of the mobile device 1200, the time information 1402 corresponding to the prediction location, the bitrate information 1403 corresponding to the predicted position, and the cache ID information 1404 corresponding to the predicted position. For example, the prediction response message can indicate that the mobile device 1200 is predicted to be located at Position 1 at Time 1 after a particular time and that the mobile device 1200 at Position 1 at Time 1 is predicted to receive the video streaming service from the target cache having the corresponding cache ID at Bitrate 1. Next, the LOCAS 1206 finishes the process according to another embodiment of the present disclosure.

Figure 17:
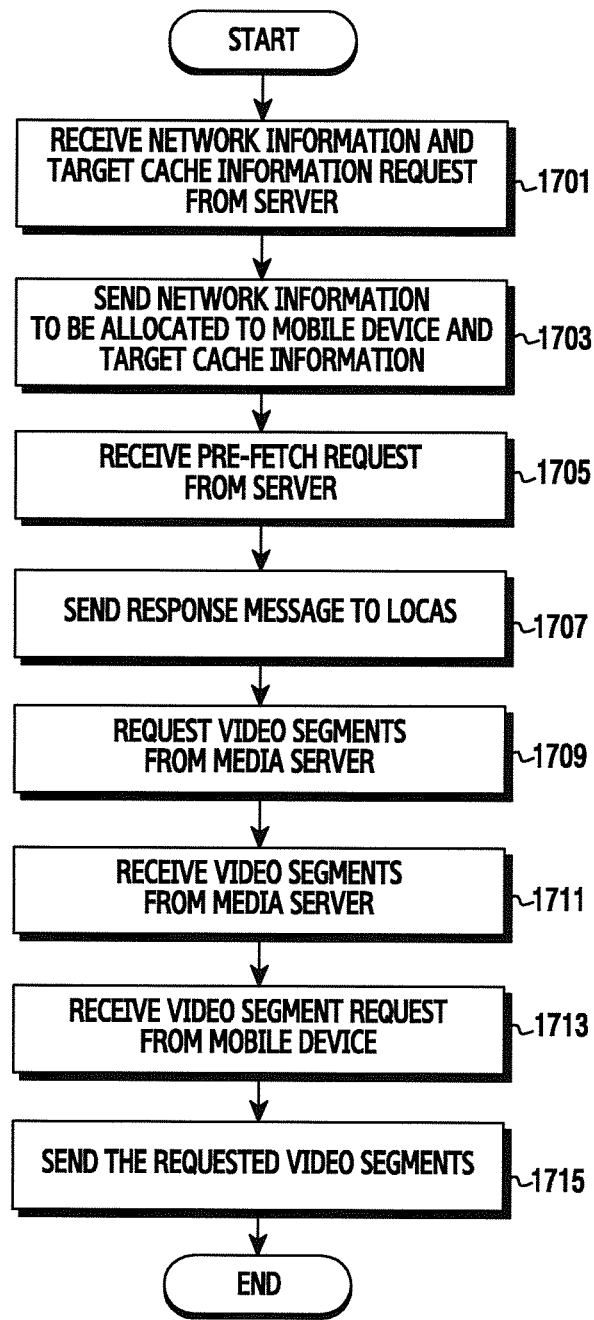
FIG. 17 illustrates a pre-fetching procedure for providing a video streaming service of a mobile device in a target BS according to another embodiment of the present disclosure.

FIG. 17 illustrates a pre-fetching procedure for providing a video streaming service of a mobile device in a target BS according to another embodiment of the present disclosure.

Referring to FIG. 17, the target BS 1202 receives a message requesting the network information and the cache information from the LOCAS 1206 in operation 1701. The network information and cache information request message can include, as shown in FIG. 13A, the type information 1300 indicating that the corresponding message is the information request message of the mobile device 1200, the ID information 1302 of the mobile device 1200, the resource information 1304 of the mobile device 1200, and the cache ID request flag 1306. Herein, the resource information 1304 of the mobile device 1200 can be the QCI or the ARP of the mobile device. The cache ID request flag, which is the 1-bit flag, can request the cache ID of the target BS 1202. That is, the target BS 1701 can receive the network information and cache information request message of FIG. 13A, and thus be requested to send the network resource information allocable by the target BS 1202 to a user equipment, and the cache (or target cache) address of the target BS 1202.

Next, the target BS 1202 extracts the ID information and the resource allocation information of the mobile device 1202 from the network information and cache information request message, determine a radio resource to be allocated to the mobile device 1200 based on the extracted information, and obtain the ID (or IP address) of a cache 1204 coupled to the target BS 1202. The target BS 1202 sends a network information and cache information response message including the radio resource information to be allocated to the mobile device 1200 and the cache ID, to the LOCAS 1206 in operation 1703. In so doing, the network information and cache information response message can include, as shown in FIG. 13B, the type information 1310 indicating that the corresponding message is a response message of the mobile device 1200, the ID information 1312 of the mobile device 1200, the network resource information 1314, and the cache ID information 1316. In so doing, the network resource information 1314 can include at least one of the radio resource block allocable by the target BS 1202 to the mobile device 1200 per unit time, the number of the service users of the target BS 1202, and the congestion of the target BS 1202.

In operation 1705, the target BS 1202 receives a message requesting to pre-fetch video segments expected to be requested by the mobile device 1200 after the handover, from the LOCAS 1206. That is, the target BS 1202 can detect that the pre-fetch request message is received from the target cache 1204 coupled to the target BS 1202. Herein, the pre-fetch request message can include, as shown in FIG. 13C, the type information 1320 indicating that the corresponding message is the request message to the cache 1204, the content information (e.g., content URL) 1322 used by the mobile device 1200 through the video streaming service, and the information 1324 of the mobile device 1200.

The target BS 1202 recognizing the reception of the pre-fetch request message sends a response message notifying the pre-fetching, to the LOCAS 1208 by controlling the target cache 1204 in operation 1707. Next, the target BS 1202 controls the target cache 1204 to send a video request message requesting to send video segments expected to be requested by the mobile device 1200 after the handover, to the media server 1210 in operation 1709, receive a video response message including the requested video segments from the media server 1210, and stores the video segments in the target cache 1204. In so doing, the video request message can include the ID information of the corresponding mobile device 1200 and corresponding content information.

Next, the target BS 1202 can receive a video request message requesting to send video segments to the target cache 1204 at a particular bitrate, and send a video response message including video segments pre-stored in the target cache 1204, to the mobile device 1200.

Next, the target BS 1202 finishes the process according to another embodiment of the present disclosure.

In the above-stated embodiment, while the LOCAS 1206, the GIS 1208, and the media server 1210 are independently separated by way of example, at least two servers of the LOCAS 1206, the GIS 1208, and the media server 1210 may be configured as a single server. Also, while the target BS 1202 and the target cache 1204 are physically separated by way of example in the above description, the target cache 1204 may be installed in the target BS 1202.

Figure 18:
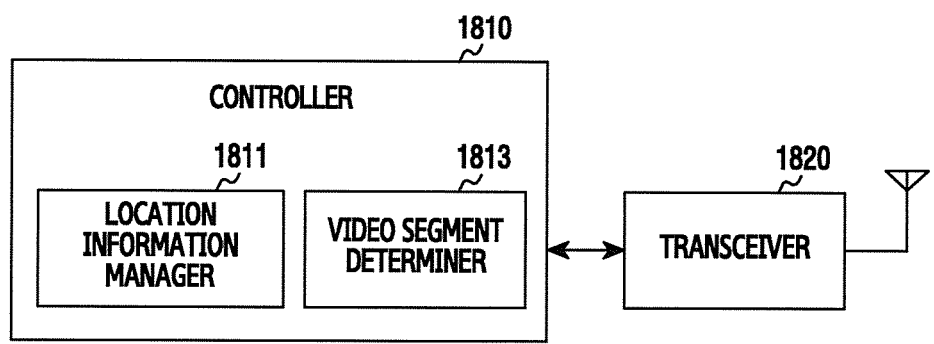
FIG. 18 illustrates a block diagram of a mobile device according to an embodiment of the present disclosure.

FIG. 18 depicts a block diagram of a mobile device according to an embodiment of the present disclosure.

Referring to FIG. 18, the mobile device can include a controller 1810 and a transceiver 1820.

The controller 1810 controls and processes general operations of the mobile device, and particularly, includes a location information manager 1812 and a video segment determiner 1813, to thus control and process to receive the video streaming service.

To predict the bitrate of the video streaming service during the video streaming service of the mobile device, the location information manager 1812 controls and processes to send the message reporting necessary information to predict the channel state of the moving path of the mobile device 1200, to the LOCAS. In so doing, the report message can be constructed as shown in FIG. 2 or FIG. 6. The report message may be transmitted when the mobile device is to receive the video streaming service, when the mobile device is receiving the video streaming service, when a particular event takes place, or on a periodic basis.

Also, when receiving the bitrate response message from the LOCAS, the video segment determiner 1813 selects the bitrate corresponding to the current location, and controls and processes to receive video segments at the selected bitrate. In so doing, the bitrate response message can be constructed as shown in FIG. 7 or FIG. 14. According to one embodiment of the present disclosure, the video segment determiner 1813 analyzes the bitrate response message and thus determines whether the bitrate abruptly decreases in the moving path of the mobile device. When the bitrate abruptly does not decrease in the moving path, the video segment determiner 1813 can control and process to select the bitrate corresponding to the current channel state based on the bitrate response message and to send the message requesting to send video segments based on the selected bitrate, to the media server. By contrast, when the bitrate abruptly decreases in the moving path, the video segment determiner 1813 can control and process to select the lower bitrate than the bitrate corresponding to the current channel state in order to pre-fetch video segments, and to send the video request message for requesting to send media segments at the selected bitrate, to the media server. According to another embodiment of the present disclosure, the video segment determiner 1813 selects the bitrate corresponding to the current location. With the cache ID of the target BS corresponding to the current location, the video segment determiner 1813 requests the target cache to send video segments using the cache ID corresponding to the current location and the selected bitrate, and controls and processes to receive the video segments from the target cache.

The transceiver 1820 transmits and receives signals or messages under control of the controller 1810. For example, the transceiver 1820 transmits and receives messages for the video streaming service to and from the BS, the LOCAS, and/or the media server.

Figure 19:
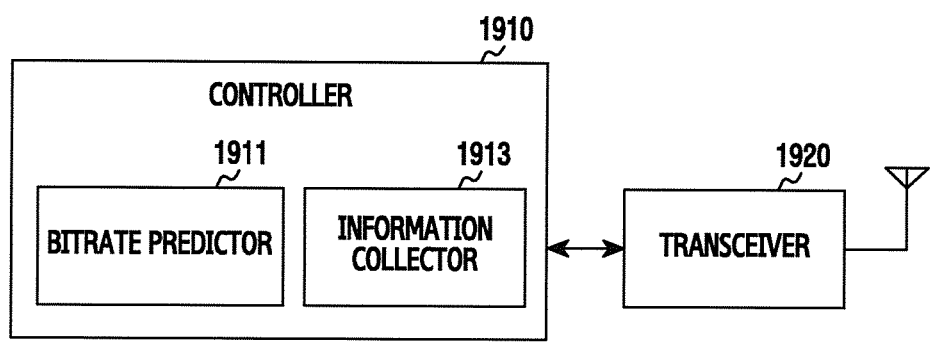
FIG. 19 illustrates a block diagram of a LOCAS according to an embodiment of the present disclosure.

FIG. 19 depicts a block diagram of a LOCAS according to an embodiment of the present disclosure.

Referring to FIG. 19, the LOCAS can include a controller 1910 and a transceiver 1920.

The controller 1910 controls and processes general operations of the LOCAS, and particularly, includes a bitrate predictor 1912 and an information collector 1913, to thus control and process to predict the bitrate for the video streaming service of the mobile device.

When receiving from the mobile device the message requesting to predict the bitrate per moving path with respect to the video segments, the information collector 1913 controls and processes to extract the moving path information of the mobile device from the bitrate prediction request message and to obtain additional path information from the GIS using the extracted moving path information. Herein, the bitrate prediction request message can include, as shown in FIG. 6, the type information 601 indicating that the corresponding message is the bitrate prediction request message, the current position and/or moving path information 603 of the mobile device 500, the channel information 605, the ID information 607 of the mobile device 500, the current time information 609, and the content URL or MPD URL information 611. Also, the information collector 1913 can obtain the additional path information about the moving path of the mobile device using the GI request message of FIG. 3A and the GI response message of FIG. 3B.

Also, the information collector 1913 predicts the location to which the mobile device will move after the segment unit time from the current time, based on the information received from the mobile device and the information received from the GIS, and obtains the network resource information of the user equipment through the BS predicted to serve the mobile device after a particular segment time. In so doing, the information collector 1913 can obtain the network resource information of the user equipment using the network information request message of FIG. 4A and the network information response message of FIG. 4B. Also, the information collector 1913 predicts whether the mobile device 1200 hands over based on the predicted location of the mobile device, and obtains the network resource information and the cache information of the user equipment from the handover target BS. In so doing, the information collector 1913 can obtain the network resource information and the cache information of the user equipment using the network information and cache information request message of FIG. 13A and the network information and cache information response message of FIG. 13B.

Also, using the target cache information of the target BS, the information collector 1913 can request to pre-fetch the video segments of the mobile device to the target BS. In so doing, the pre-fetch request message can be constructed as shown in FIG. 13C.

The bitrate predictor 1911 predicts the bitrate per prediction location of the mobile device based on the information obtained by the information collector 1913. For example, the bitrate predictor 1911 can determine or predict the bitrate corresponding to the predicted location of the mobile device by considering the channel state of the location predicted to be positioned by the mobile device at a particular time along the moving path of the mobile device, the topographic information, the traffic information, the transportation information, and the network resource. The bitrate predictor 1911 sends to the mobile device 500 the bitrate prediction response message including the predicted bitrate information per prediction location of the mobile device and/or the target cache information. In so doing, the bitrate prediction response message may be constructed as shown in FIG. 7 or FIG. 14.

The transceiver 1920 transmits and receives signals or messages under control of the controller 1910. For example, the transceiver 1920 transmits and receives messages required to provide the video streaming service of the user equipment to and from the mobile device, the BS, and the GIS.

Figure 20:
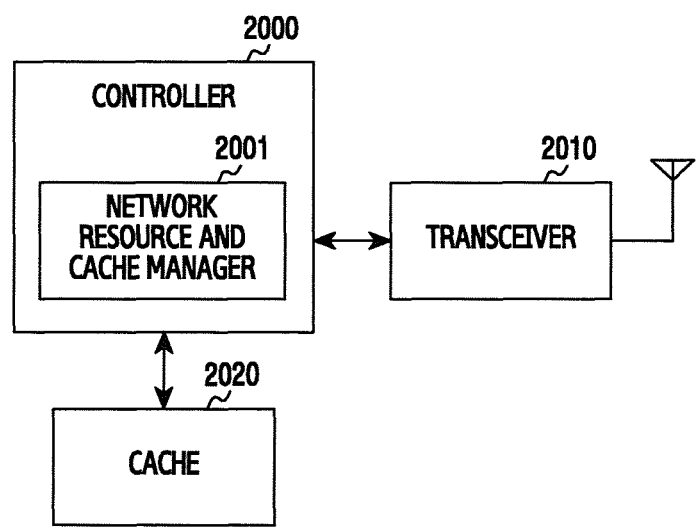
FIG. 20 illustrates a block diagram of a target BS according to an embodiment of the present disclosure.

FIG. 20 illustrates a block diagram of a target base station according to an embodiment of the present disclosure.

Referring to FIG. 20, the target BS can include a controller 2000, a transceiver 2010, and a cache 2020.

The controller 2000 controls and processes general operations of the BS, and particularly, includes a network resource and cache manager 2001 for controlling and processing to allocate the resource to the mobile device and to support the video streaming service of the mobile device.

When receiving the message requesting the network information and the cache information from the LOCAS, the network resource and cache manager 2001 extracts the ID information and the resource allocation information of the mobile device from the network information and cache information request message, determines the radio resource to be allocated to the mobile device based on the extracted information, and obtain the ID (or IP address) of a cache 2020 coupled to the target BS. The network information and cache information request message can be constructed as shown in FIG. 13A.

The network resource and cache manager 2001 controls and processes to send the network information and cache information response message including the radio resource information to be allocated to the mobile device and the cache ID, to the LOCAS. In so doing, the network information and cache information response message can be constructed as shown in FIG. 13B.

When receiving from the LOCAS the message requesting to pre-fetch the video segments expected to be requested by the mobile device after the handover, the network resource and cache manager 2001 controls and processes to send the response message notifying the pre-fetching to the LOCAS, to request the media server to send the corresponding video segments, to receive the corresponding video segments, and to store the received video segments in the cache 2020. Herein, the pre-fetching request message can be constructed as shown in FIG. 13C, and the message requesting the media server to send the corresponding video segments can include the ID information of the corresponding mobile device and the corresponding content information.

After the corresponding mobile device hands over to the target BS, the network resource and cache manager 2001 controls and processes to send the video segments stored in the cache 2020 at the bitrate selected by the mobile device.

The transceiver 2010 transmits and receives signals or messages under control of the controller 2000. For example, the transceiver 2010 transmits and receives messages required to provide the video streaming service of the user equipment to and from the mobile device, the LOCAS, and the media server.

The exemplary embodiments and all of the functional operations of the present disclosure described herein can be implemented in computer software, firmware, hardware, or in combinations of one or more of them including the structures disclosed in this specification and their structural equivalents. The exemplary embodiments of the present disclosure can be implemented as one or more computer program products, that is, one or more data processors, or one or more modules of computer program instructions encoded on a computer-readable medium to control this device.

The computer-readable medium can be a machine-readable storage medium, a machine-readable storage substrate, a memory device, a material affecting a machine-readable propagated stream, or a combination of one or more of these. The term 'data processing device' encompasses every device, apparatus, and machine including, for example, a programmable processor, a computer, multiple processors, or a computer, for processing data. The device can be added to the hardware and include code for creating an execution environment of a corresponding computer program, for example, code for constituting processor firmware, a protocol stack, a database management system, an operating system, or a combination of one or more of these.

The present disclosure can provide more stable streaming service to the user by predicting in advance the channel state and the handover along the moving path of the mobile device, selecting the quality of the video segments based on the prediction result, and pre-fetching the plurality of the video segments to the mobile device or the handover target BS when the channel is poor or the handover takes place. Further, since the stable streaming service is provided, it is possible to reduce redundant traffic caused by service failure, to reduce external traffic by using the cache in the BS, and to lessen load of the whole network.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile device to provide a video streaming service, the method comprising:
    transmitting periodically, to a first server, location and moving path information of the mobile device;
    receiving, from the first server, bitrate information for a plurality of locations on which the mobile device is predicted to move;
    identifying, based on the bitrate information, at least one location in which at least one bitrate for the plurality of locations is lower than a threshold;
    determining whether a second bitrate of a second time point that the mobile device moves to the at least one location is lower than a first bitrate before the second time point;
    in response to determining that the second bitrate is lower than the first bitrate, changing the first bitrate to a third bitrate lower than the second bitrate;
    transmitting, to a second server, a request signal for requesting the second server to send video segments for the plurality of locations before the second time point based on the third bitrate;
    receiving from the first server, target base station (BS) information per location; and
    determining whether there is target BS information at a predicted location corresponding to a current location of the mobile device,
    wherein, when there is target BS information at the predicted location corresponding to the current location of the mobile device, requesting the second server to send the video segments based on the third bitrate for requesting to send the video segments for the plurality of locations comprises: requesting a target BS of the predicted location corresponding to the current location of the mobile device to send video segments pre-stored in the target BS,
    wherein a number of the video segments comprises a minimum number of video segments required to provide the video streaming service before the second time point based on the first bitrate and a minimum number of video segments required to provide the video streaming service after the second time point based on the second bitrate.

2. The method of claim 1, further comprising:
    receiving, from the second server, the video segments before the second time point.

3. The method of claim 1, wherein the target BS information is identification information or an Internet Protocol (IP) address of a storage device storing the video segments.

4. A method for operating a first server to provide a video streaming service, the method comprising:
    receiving periodically, from a mobile device, location and moving path information of the mobile device;
    predicting a plurality of locations to which the mobile device moves after each segment unit time using the location and moving path information of the mobile device;
    predicting a bitrate information for the plurality of locations; and
    transmitting, to the mobile device, the bitrate information for the plurality of locations,
    wherein at least one location in which at least one bitrate for the plurality of locations is lower than a threshold is identified based on the bitrate information,
    wherein whether a second bitrate at a second time point at which the mobile device moves to a predicted location is lower than a first bitrate at a time before the second time point is determined,
    wherein the first bitrate is changed to a third bitrate lower than the second bitrate in response to determination that second bitrate is lower than the first bitrate,
    wherein a request signal for requesting a second server to send video segments for the plurality of locations is transmitted before the second time point based on the third bitrate, and
    wherein a number of the video segments comprises a minimum number of video segments required to provide the video streaming service before the second time point based on the first bitrate and a minimum number of video segments required to provide the video streaming service after the second time point based on the second bitrate.

5. The method of claim 4, wherein the bitrate information for the plurality of locations predicts the bitrate based on at least one of topographic information of the predicted location, traffic information, channel information, transportation information of the mobile device, network resource information expected to be allocated to the mobile device at the predicted location, congestion of a base station (BS) which serves the mobile device at the predicted location, or a number of serving mobile devices.

6. The method of claim 4, further comprising:
predicting, based on the predicted location, whether the mobile device hands over; and
when predicting handover of the mobile device at a particular predicted location, requesting a handover target base station (BS) of the mobile device to receive in advance video segments expected to be requested to the second server by the mobile device after the handover.

7. The method of claim 6, further comprising:
requesting, from the handover target BS, information of a storage device for storing the video segments; and
notifying the mobile device to receive the video segments from the storage device at the particular predicted location.

8. An apparatus of a mobile device to provide a video streaming service, the apparatus comprising:
a transceiver; and
a controller configured to:
    transmit periodically, to a first server, location and moving path information of the mobile device,
    receive, from the first server, bitrate information for a plurality of locations on which the mobile device is predicted to move,
    identify based on the bitrate information, at least one location in which at least one bitrate for the plurality of locations is lower than a threshold,
    determine whether a second bitrate of a second time point that the mobile device moves to the at least one location is lower than a first bitrate before the second time point,
    in response to determination that second bitrate is lower than the first bitrate, change the first bitrate to a third bitrate lower than the second bitrate,
    transmit, to a second server, a request signal for requesting the second server to send video segments for the plurality of locations before the second time point based on the third bitrate,
    receive, from the first server, target base station (BS) information per location, and
    determine whether there is target BS information at a predicted location corresponding to a current location of the mobile device,
    wherein, when there is target BS information at the predicted location corresponding to the current location of the mobile device, requesting the second server to send the video segments based on the third bitrate for requesting to send the video segments for the plurality of locations comprises: requesting a target BS of the predicted location corresponding to the current location of the mobile device to send video segments pre-stored in the target BS, and
    wherein a number of the video segments comprises a minimum number of video segments required to provide the video streaming service before the second time point based on the first bitrate and a minimum number of video segments required to provide the video streaming service after the second time point based on the second bitrate.

9. An apparatus of a first server to provide a video streaming service, the apparatus comprising:
a transceiver configured to send and receive signals to and from a mobile device; and
a controller configured to control to:
    receive, from the mobile device, location and moving path information of the mobile device,
    predict a plurality of locations on which the mobile device is predicted to move after each segment unit time using the location and moving path information of the mobile device,
    predict a bitrate information for the plurality of locations, and
    transmit, to the mobile device, the bitrate information for the plurality of locations,
    wherein at least one location in which at least one bitrate for the plurality of locations is lower than a threshold is identified based on the bitrate information,
    wherein whether a second bitrate at a second time point at which the mobile device moves to a predicted location is lower than a first bitrate at a time before the second time point is determined,
    wherein the first bitrate is changed to a third bitrate lower than the second bitrate in response to determination that second bitrate is lower than the first bitrate,
    wherein a request signal for requesting a second server to send video segments for the plurality of locations is transmitted before the second time point based on the third bitrate, and
    wherein a number of the video segments comprises a minimum number of video segments required to provide the video streaming service before the second time point based on the first bitrate and a minimum number of video segments required to provide the video streaming service after the second time point based on the second bitrate.

10. The apparatus of claim 8, wherein the controller is further configured to:
receive, from the second server, the video segments before the second time point.

11. The apparatus of claim 8, wherein the target BS information is identification information or an Internet Protocol (IP) address of a storage device storing the video segments.

* * * * *